United States Patent Office 3,639,311
Patented Feb. 1, 1972

3,639,311
METHYL METHACRYLATE-NITROCELLULOSE ADHESIVE COMPOSITION
Harold O. Buzzell, Wollaston, Mass., assignor to Polaroid Corporation, Cambridge, Mass.
No Drawing. Filed Jan. 11, 1968, Ser. No. 697,019
Int. Cl. C08f 29/46; C09j 3/16
U.S. Cl. 260—17                 2 Claims

ABSTRACT OF THE DISCLOSURE

Many of the physical problems encountered in the production of an optically perfect lamination between polymethyl methacrylate and cellulose acetate butyrate may be obviated by utilizing an adhesive comprising approximately 95% methyl methacrylate monomer, approximately 4% nitrocellulose having a viscosity within the range of 600 to 1000 seconds$^{-1}$ and about 1% of an initiator for the monomer.

---

The instant invention is concerned with the lamination of cellulose acetate butyrate to polymethyl methacrylate in order to provide an optically perfect bond.

More particularly, this invention relates to laminates capable of providing a light-polarizing function wherein said laminates comprise layers of cellulose acetate butyrate and polymethyl methacrylate bonded to one another by means of an adhesive comprising approximately 95% methyl methacrylate monomer, 4% nitrocellulose having a viscosity of approximately 600 to 1000 seconds$^{-1}$ and about 1% of an initiator for the monomer.

It is a primary object of the present invention to provide an adhesive which will result in a substantially optically perfect bond between cellulose acetate butyrate and polymethyl methacrylate.

It is an additional object of the present invention to provide an optical element and particularly a light-polarizing optical element containing layers of polymethyl methacrylate and cellulose acetate butyrate bonded together with an adhesive comprising approximately 95% methyl methacrylate monomer, 4% nitrocellulose having a viscosity of approximately 600 to 1000 seconds$^{-1}$ and 1% of an initiator for the monomer.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed description.

In copending U.S. applications of Albert S. Makas and Arthur D. Alexander III, Ser. Nos. 697,113, now abandoned and 697,111, respectively, both assigned to Polaroid Corporation filed on the same date as the instant application, light-polarizing optical structures are disclosed wherein a polymethyl methacrylate element is directly bonded to a cellulose acetate butyrate element. The preferred bonding material is disclosed as an adhesive comprising approximately 95% methyl methacrylate, 4% nitrocellulose having a viscosity of approximately 600 to 1000 seconds$^{-1}$ and about 1% by weight of a diisopropyl percarbonate initiator.

In determining a proper technique and adhesive for bonding cellulose acetate butyrate to polymethyl methacrylate many frustrating and costly problems have been encountered. These, in general, may all be related to drying times of various adhesives and the presence of solvents in said adhesives which may cause softening of the bonded surfaces, shrinkage, blistering, and will, in general, provide an unsuitable, nonoptically perfect lamination. Quite unexpectedly, it has been found that an adhesive, as described above, which comprises approximately 95% methyl methacrylate monomer, approximately 4% nitrocellulose having a viscosity of approximately 600 to 1000 seconds$^{-1}$ and approximately 1% of an initiator for the monomer provides an ideal bond which is resistant to peeling and blistering and provides the laminated component with a long, optically perfect, useful life. Due to the diverse characteristics of the surfaces of cellulose acetate butyrate and polymethyl methacrylate, it will be appreciated that the problem of finding an adhesive which would provide such a bond was a formidable one.

The procedure for the preparation of the adhesive of the present invention is to blend approximately 32 gms. of nitrocellulose having a viscosity of approximately 600 to 1000 seconds$^{-1}$ and 800 gms. of methyl methacrylate with a mechanical stirrer until a homogeneous mixture is produced. A working viscosity may be obtained by diluting this master batch with methyl methacrylate to approximately 3½ to 5 minutes$^{-1}$ (Zahn Cup No. 2). The initiator is added just prior to the application of the adhesive to the surfaces which are to be bonded. Bonding is carried out using standard pressure roller techniques. In a preferred embodiment laminating pressures in the range of 25 to 30 pounds gauge along a fourteen inch wide laminating contact surface, and speeds not greater than 3 to 4 feet per minute using laminating rollers with a Shore A hardness of 50 to 75 are considered optimum. Variations in glue line thickness which may be associated with the hardness of the roller has a direct relationship to bond strength and may be obviated by adjusting the roller pressure. Among the initiators which have been found useful with the instant adhesive are diisopropyl percarbonate, benzoyl peroxide, methylethyl ketone hydroperoxide, etc. It was found, however, that the greatest bond strengths and longest pot life were achieved using diisopropyl percarbonate, which is the initiator utilized in the preferred embodiment of the present invention.

It is theorized that in the instant system the methyl methacrylate monomer rapidly penetrates into the cellulose acetate butyrate surface and very slowly diffuses into the polymethyl methacrylate surface. This is due to a molecular filtration or dialysis which occurs and effectively removes the nitrocellulose from solution and deposits it as a thin glue line layer. The cellulose acetate butyrate acts as a membrane which absorbs the methyl methacrylate and, upon polymerization serves to very tightly affix itself to the polymerized methyl methacrylate through a more or less physical attachment, i.e., the pores of the cellulose acetate butyrate are filled with the methyl methacrylate monomer and said monomer is polymerized in situ. Absorption as well as diffusion, it is theorized, are the primary factors involved in bonding the adhesive to the polymethyl methacrylate.

In customary usage the cellulose acetate butyrate contained in the composite light-polarizing optical device of the present invention will be within the range of approximately 4 to 30 mils in thickness and preferably about 5 mils thick; and the light-polarizing element will be within the range of approximately 0.75 to 1.5 mils in thickness and preferably about 0.75 mil thick. The polymethyl methacrylate member may be of any thickness commensurate with the structural requirements of the composite system.

Any suitable light-polarizing material, such as, for example, polyvinyl alcohol containing substantially oriented molecules of dehydrated polyvinyl alcohol and deriving its polarizing properties essentially from said dehydrated molecules, capable of being affixed to or carried by the cellulose acetate butyrate element of the present invention's composite structure may be utilized therewith. The manufacture and use of such material may be appreciated with reference to U.S. Pats. Nos. 2,173,304; 2,255,940; 2,306,108; 2,397,231; 2,445,555; 2,453,186 and 2,674,159, all incorporated herein by reference.

In addition suitable methods by which laminations of light-polarizing materials to cellulose acetate butyrate may be accomplished are described in the U.S. application of Harold O. Buzzell, Ser. No. 577,578, also incorporated herein by reference.

It will be recognized that minor deviations, on the order of about 2% in the percentages designated of the components of the adhesive of the present invention may be employed at the election of the operator and are intended to be encompassed within the percentages disclosed and claimed herein.

Throughout the specification various compositions are defined in terms of percentages of components. Unless otherwise indicated, all recited percentages are by weight.

Since certain changes may be made in the above product without departing from the scope of the invention herein involved, it is intended that all matter contained in the above description shall be interpreted as illustrative and not in a limiting sense.

What is claimed is:

1. An adhesive composition consisting essentially of approximately 95% by weight methyl methacrylate monomer, approximately 4% by weight nitrocellulose having a viscosity of approximately 600 to 1000 seconds$^{-1}$ and approximately 1% by weight of a polymerization initiator for said monomer.

2. The invention of claim 1 wherein said initiator is diisopropyl percarbonate.

References Cited

UNITED STATES PATENTS

| | | | |
|---|---|---|---|
| 2,091,615 | 8/1937 | Rohm et al. | 260—89.5 A X |
| 2,464,062 | 3/1949 | Strain | 260—89.5 A X |
| 2,794,788 | 6/1957 | Coover et al. | 260—17 A |
| 3,055,851 | 9/1962 | Sanderson et al. | 260—17 |

WILLIAM H. SHORT, Primary Examiner

L. M. PHYNES, Assistant Examiner

U.S. Cl. X.R.

156—328; 161—249; 260—89.5 A